United States Patent [19]

Ohnishi et al.

[11] Patent Number: 4,631,170
[45] Date of Patent: Dec. 23, 1986

[54] CALCIUM-NICKEL-MISCH METAL-ALUMINUM QUATERNARY ALLOY FOR HYDROGEN STORAGE

[75] Inventors: Keizo Ohnishi; Takatoshi Ogawa, both of Hokkaido, Japan

[73] Assignee: The Japan Steel Works, Ltd., Tokyo, Japan

[21] Appl. No.: 762,247

[22] Filed: Aug. 5, 1985

[30] Foreign Application Priority Data

Oct. 5, 1984 [JP] Japan ............... 59-208048

[51] Int. Cl.$^4$ ............................... C01B 6/24
[52] U.S. Cl. ............... 420/455; 420/900; 423/644
[58] Field of Search ............ 420/900, 455, 460; 423/644 R, 648 R

[56] References Cited

U.S. PATENT DOCUMENTS 4,358,432 11/1982 Gamo et al. ............ 423/644
4,409,180 10/1983 Sandrock et al. ............ 420/455

FOREIGN PATENT DOCUMENTS 19129 2/1978 Japan ............... 420/900
11095 1/1979 Japan ............... 420/900
143036 8/1984 Japan ............... 420/900
60075 10/1984 Japan .

*Primary Examiner*—Christopher W. Brody
*Attorney, Agent, or Firm*—Sughrue, Mion, Zinn, Macpeak and Seas

[57] ABSTRACT

A calcium-nickel-misch metal-aluminum quaternary alloy for hydrogen storage having an enhanced hydrogen absorbing/releasing capability which allows for the selection of equilibrium pressures for metal hydride formation and dissociation over a broad temperature range. The alloy has the formula:

$$CaNi_aMm_bAl_c,$$

wherein Mm is a misch metal; a, b and c are, respectively, atomic ratios of Ni, Mm and Al, with Ca taken as unity; and $5-(b+c)<a\leq 8$, $0<b\leq 0.4$, and $0<c\leq 0.6$.

2 Claims, 2 Drawing Figures

CALCIUM-NICKEL-MISCH METAL-ALUMINUM QUATERNARY ALLOY FOR HYDROGEN STORAGE

BACKGROUND OF THE INVENTION

The present invention relates to a calcium-nickel base alloy that stores large amounts of hydrogen at a predetermined temperature and hydrogen gas pressure and which is capable of readily releasing hydrogen either by slight pressurization or by reduction of hydrogen gas pressure or by a combination of these methods.

Hydrogen is expected to become the core element of the secondary forms of energy to be employed in the projected future. While hydrogen may be stored and transmitted in the form of a high-pressure gas or liquid hydrogen or even as a solid metal hydride, the last mentioned form is gaining increasing interest in the laboratory due to safety considerations and the ease of handling.

The following reasons may be given to explain the potential utility of metal hydrides: (1) they can store at least 1,000 times as much hydrogen per unit volume as hydrogen gas containers and can store as much hydrogen gas as liquid hydrogen vessels; (2) metal hydrides do not require the use of pressure vessels for hydrogen storage and no special caution need be exercized with respect to pressure resistance or hydrogen embrittlement; (3) metal hydrides are thermodynamically stable and permit extended hydrogen storage without experiencing the considerable hydrogen loss that occurs in the case of liquid hydrogen; and (4) most metal hydrides have a generally constant dissociation pressure so that when heated to a dissociation temperature, hydrogen gas of a constant pressure is generated.

In addition to storage containers, the potential use of metal hydrides covers fuel cells, fuel tanks for internal combustion engines, hydrogen refiners, home heating and cooling, compressors and refrigerators. Metal hydrides have many advantages over other conventional means for hydrogen storage and transmission in terms of improved safety, availability of simpler equipment, and enhanced performance.

While immobilization of hydrogen in the form of metal hydrides holds great promise as an elegant method of hydrogen storage and transmission, commercial alloys for hydrogen storage must meet the following requirements: (1) they are easily activated, (2) they suffer minimum deterioration as a result of cyclic hydrogen occlusion and release, (3) pressure equilibrium for the formation and dissociation of metal hydrides can be freely selected over a broad temperature range, (4) pressure equilibrium curves for hydrogen occlusion and release have minimum hysteresis, (5) rapidity of hydrogen occlusion and release, and (7) low cost.

While various alloys for hydrogen storage have been proposed to date, one that holds the most promise for commercialization is that disclosed in Japanese Patent Application No. 58-60075, namely:

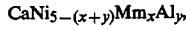

$CaNi_{5-(x+y)}Mm_xAl_y$, where Mm is a misch metal, x and y are respectively atom ratios of Mm and Al with Ca taken as unity, and $0 < x \leq 0.4$ and $0 < y \leq 0.6$. Most conventional $CaNi_5$ base binary alloys are fairly thermally unstable, and as hydrogen occlusion and release cycles are repeated, an alloy phase that is inactive to hydrogen is irreversibly precipitated from the $CaNi_5$, causing a drop in the alloy's ability to occlude hydrogen. The proposed alloy suppresses this problem by the combined addition of a misch metal and aluminum.

The present inventors made continued studies on this alloy and found the following:

(1) Since nickel is partly replaced by a misch metal and aluminum, the composition of the alloy is determined by the amounts of misch metal and aluminum and it is difficult to allow for free selection of the equilibrium pressures of a metal hydride formation and dissociation in the neighborhood of room temperature; and (2) the reduced nickel content leads to a smaller proportion of the $CaNi_5$ responsible for hydrogen occlusion, and this unavoidably results in a decreased hydrogen occlusion by the alloy.

SUMMARY OF THE INVENTION

As a result of various studies made to improve the quaternary alloy of $CaNi_{5-(x+y)}Mm_xAl_y$ ($0 < x \leq 0.4$ and $0 < y \leq 0.6$) and increase its commercial feasibility, the present inventors have found that a quaternary alloy wherein part of the nickel is similarly replaced by a misch metal and aluminum but which has a higher nickel content than the prior art alloy provides a hydrogen storing material having great commercial viability. The present invention has been accomplished on the basis of this finding.

In accordance with the present invention, there is provided a calcium-nickel-misch metal-aluminum quaternary alloy for hydrogen storage that reacts with hydrogen to form a metal hydride, the alloy having the formula:

$CaNi_aMm_bAl_c$, wherein Mm is misch metal; a, b and c are, respectively, atomic ratios of Ni, Mm and Al, with Ca taken as unity; $5-(b+c) < a \leq 8$, $0 < b \leq 0.4$, and $0 < c \leq 0.6$.

The misch metal present in the alloy of the present invention consists essentially of about 50% Ce, about 30% La, and about 15% Nd, the balance being other rare earth elements and impurity elements (0.86% Fe, etc.)

DESCRIPTION OF THE PREFERRED EMBODIMENTS

The atom ratios of Ni, Mm and Al in the hydrogen storing alloy of the present invention are a, b and c, with Ca taken as unity, and the respective values were determined for the following reasons.

If, with $CaNi_aMm_bAl_c$, $5-(b+c) < a$, the amount of hydrogen occluded and the equilibrium pressures for metal hydride formation and dissociation are increased as the value of a is increased, and this enables the selection of an alloy that allows for a continuous change in hydrogen pressure at temperatures in the vicinity of room temperature. The profile of initial hydrogen occlusion by $CaNi_aMm_{0.15}Al_{0.10}$ ($4.75 < a \leq 8$) as a function of Ni content is shown in FIG. 1, from which it can be seen that considerable hydrogen occlusion occurs in the Ni atomic range of 5 to 8.

Figure 1:
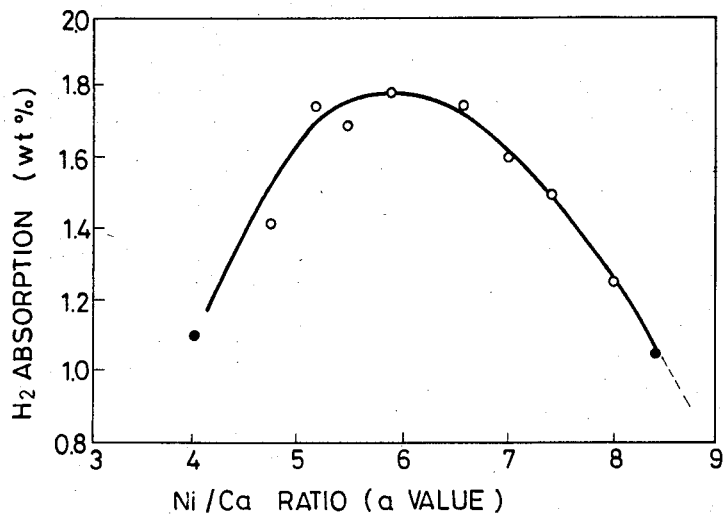
FIG. 1 is a graph showing the profile of initial hydrogen occlusion by $CaNi_aMm_{0.15}Al_{0.10}$ ($4.75 < a \leq 8$) as a function of Ni content.
Figure 2:
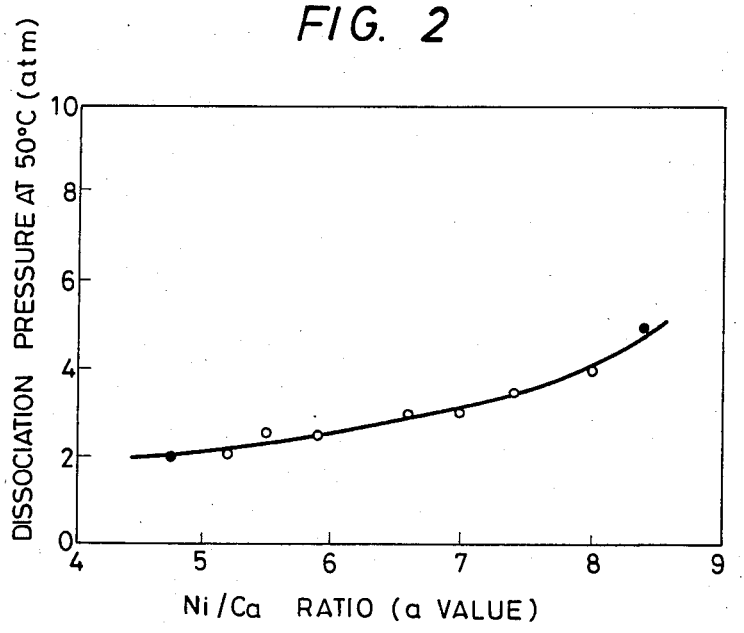
FIG. 2 is a graph showing the profile of the metal hydride dissociation pressure of $CaNi_aMm_{0.15}Al_{0.10}$ ($4.75 < a \leq 8$) at 50° C. as a function of Ni content.

In FIG. 1, the small circles refer to samples of the present invention, whereas the dots indicate comparative samples. FIG. 2 shows the profile of metal hydride dissociation pressure of $CaNi_aMm_{0.15}Al_{0.10}$ ($4.75 < a \leq 8$) at 50° C. as a function of Ni content. Obviously, the equilibrium pressure of the alloy increases or decreases with the corresponding increase or decrease of the Ni content in the range of 5 to 8, thus enabling the selection of an alloy having the desired equilibrium pressures for metal hydride formation and dissociation. Therefore, by satisfying the relation $5-(b+c) < a$, alloys are obtained that are capable of increased hydrogen occlusion and which allow for the selection of equilibrium pressures for metal hydride formation and dissociation over a broad temperature range.

As will be later shown in Table 1, if $5-(b+c) < a$, the capability of hydrogen occlusion experiences a very small amount of variation even if occlusion and release cycles are repeated 200 times, a fact that indicates that the effect of combined addition of a misch metal and aluminum (as described below) to maintain or improve the amount of hydrogen occluded or released is enhanced by using a greater amount of nickel. This enhancing effect, however, is negligible if $a > 8$. If $5-(b+c) \geq a$, the amount of hydrogen occluded by the alloy is decreased significantly and no sharp plateau appears in the $H_2$ occlusion curve. Therefore, for the purposes of the present invention, atomic ratios of Ni, Mm and Al must satisfy the relation $5-(b+c) < a \leq 8$, with the range of $5 \leq a < 7$ being preferred.

As described in Japanese Patent Application No. 58-60075, the combined addition of Mm and Al is effective for achieving various results: improved resistance to cyclic hydrogen occlusion and release, preventing an appreciable increase in the equilibrium pressures for metal hydride formation and dissociation, and avoiding a marked drop in hydrogen occlusion. For the purpose of the present invention, the atomic ratios of Mm and Al must satisfy the following respective relations: $0 < b \leq 0.4$ and $0 < c \leq 0.6$.

The following Example is given for further illustration of the claimed alloy and should not be construed as limiting.

EXAMPLE

Samples having the composition $CaNi_aMm_bAl_c$ ($5-(b+c) < a \leq 8$, $0 < b \leq 0.4$ and $0 < c \leq 0.6$) in accordance with the present invention, as well as comparative samples of a composition of $CaNi_5$ or $CaNi_{5-(x+y)}Mm_xAl_y$ ($0 < x \leq 0.4$, $0 < y \leq 0.6$) were melted in an air-filled electric-arc furnace, cooled and ground into particles of 50 to 100 mesh in the atmosphere. Predetermined amounts (2 to 3 gm) of the ground samples were in set in a thermobalance system that allowed for temperature and pressure control in a high-pressure $H_2$ gas atmosphere. After evacuating the system, 99.999% pure hydrogen gas was introduced to a pressure of 30 kg/cm$^2$ that was maintained for periods of several to ten-odd minutes until the alloys started to absorb hydrogen. After completion of hydrogen absorption, the system was evacuated while being maintained at 200° C. PCT curves were taken for the respective activated alloys at 50° C. The amounts of hydrogen occluded in or released from the alloys were determined by measuring the change in their weight resulting from hydrogen occlusion and release reactions. The amounts of hydrogen absorbed in the alloys immediately after their activation, as well as the pressure for the dissociation of metal hydrides, are shown in Table 1. After taking data for drawing the PCT curves, 200 cycles of hydrogen absorption (20° C. × 60 min) and release (200° C. × 15 min) were repeated. The alloys were then activated for hydrogen absorption and the amounts of hydrogen absorbed were measured and indicated in Table 1 in the column headed "Deterioration degree in $H_2$ absorption ability" for which the initial value is taken as 1.

TABLE 1

|  | Symbol | Composition | Initial $H_2$ absorption (wet %) | Dissociation pressure (atm) | Deterioration degree in $H_2$ absorption ability |
|---|---|---|---|---|---|
| Samples of the present invention | A | $CaNi_{5.20}Mm_{0.15}Al_{0.10}$ | 1.76 | 2.0 | 0.77 |
|  | B | $CaNi_{5.50}Mm_{0.15}Al_{0.10}$ | 1.70 | 2.5 | 0.79 |
|  | C | $CaNi_{5.90}Mm_{0.15}Al_{0.10}$ | 1.79 | 2.5 | 0.80 |
|  | D | $CaNi_{6.60}Mm_{0.15}Al_{0.10}$ | 1.75 | 3.0 | 0.73 |
|  | E | $CaNi_{7.00}Mm_{0.15}Al_{0.10}$ | 1.60 | 3.0 | 0.80 |
|  | F | $CaNi_{7.40}Mm_{0.15}Al_{0.10}$ | 1.50 | 3.5 | 0.76 |
|  | G | $CaNi_{8.00}Mm_{0.15}Al_{0.10}$ | 1.25 | 4.0 | 0.71 |
|  | H | $CaNi_{6.60}Mm_{0.25}Al_{0.15}$ | 1.51 | 3.0 | 0.75 |
|  | I | $CaNi_{6.50}Mm_{0.20}Al_{0.60}$ | 1.32 | 2.0 | 0.71 |
|  | J | $CaNi_{6.70}Mm_{0.30}Al_{0.10}$ | 1.70 | 7.0 | 0.78 |
|  | K | $CaNi_{6.95}Mm_{0.30}Al_{0.10}$ | 1.72 | 6.0 | 0.80 |
|  | L | $CaNi_{7.95}Mm_{0.40}Al_{0.02}$ | 1.33 | 9.0 | 0.35 |
| Comparative Samples | M | $CaNi_{4.00}Mm_{0.40}Al_{0.60}$ | 1.10 | 2.0 | 0.65 |
|  | N | $CaNi_{4.75}Mm_{0.15}Al_{0.10}$ | 1.42 | 2.0 | 0.39 |
|  | O | $CaNi_{8.10}Mm_{0.40}Al_{0.30}$ | 1.21 | 6.0 | 0.72 |
|  | P | $CaNi_{8.40}Mm_{0.15}Al_{0.10}$ | 1.05 | 5.0 | — |

As Table 1 shows, the alloy samples in accordance with the present invention had greater capabilities of hydrogen occlusion and release than the comparative samples. Furthermore, the samples of the present invention suffered less deterioration in their performance after repeated hydrogen occlusion-release cycles.

It is therefore clear that the alloy of the present invention, which contains more nickel than the alloy of Japanese Patent Application No. 58-60075, which has part of the nickel in $CaNi_5$ replaced by Mm and Al, has an enhanced ability to absorb hydrogen and permits the selection of equilibrium pressures for metal hydride formation and dissociation over a broad temperature range.

In summary, the present invention provides a hydrogen storing alloy that withstands as many hydrogen occlusion and release cycles as can the conventional alloy, and which yet has an enhanced hydrogen absorbing/releasing capability and allows for the selection of equilibrium pressures for metal hydride formation and dissociation over a broad temperature range.

We claim:

1. A calcium-nickel-misch metal-aluminum quaternary alloy for hydrogen storage that reacts with hydrogen to form a metal hydride, said alloy having the formula:

$CaNi_aMm_bAl_c,$ wherein Mm is a misch metal; a, b and c are, respectively, atomic ratios of Ni, Mm and Al, with Ca taken as unity; and $5-(b+c)<a \leq 8$, $0<b \leq 0.4$, and $0<c \leq 0.6$.

2. The alloy of claim 1, wherein said misch metal consist essentially of about 50% Ce, about 30% La, and about 15% Nd, the balance being other rare earth elements and impurity elements.

* * * * *